US012775887B2

(12) United States Patent
Ferreira et al.

(10) Patent No.: US 12,775,887 B2
(45) Date of Patent: Oct. 27, 2026

(54) BOOTSTRAP METHOD FOR CROSS-COMPANY MODEL GENERALIZATION ASSESSMENT

(71) Applicant: Dell Products L.P., Round Rock, TX (US)

(72) Inventors: Paulo Abelha Ferreira, Rio de Janeiro (BR); Vinicius Michel Gottin, Rio de Janeiro (BR); Pablo Nascimento da Silva, Niterói (BR)

(73) Assignee: Dell Products L.P., Round Rock, TX (US)

( * ) Notice: Subject to any disclaimer, the term of this patent is extended or adjusted under 35 U.S.C. 154(b) by 797 days.

(21) Appl. No.: 18/158,599

(22) Filed: Jan. 24, 2023

(65) Prior Publication Data

US 2024/0249202 A1 Jul. 25, 2024

(51) Int. Cl.
*G06N 20/20* (2019.01)
*G06F 11/07* (2006.01)

(52) U.S. Cl.
CPC ......... *G06N 20/20* (2019.01); *G06F 11/0736* (2013.01); *G06F 11/076* (2013.01)

(58) Field of Classification Search
CPC .... G06N 20/20; G06N 20/00; G06F 11/0736; G06F 11/076
See application file for complete search history.

(56) References Cited

U.S. PATENT DOCUMENTS

| | | | |
|---|---|---|---|
| 2011/0282169 A1 | 11/2011 | Grudic et al. | |
| 2021/0191404 A1 | 6/2021 | Blake et al. | |
| 2021/0302956 A1 | 9/2021 | Sudhakaran et al. | |
| 2022/0014963 A1* | 1/2022 | Yeh | H04W 28/0268 |
| 2023/0016946 A1 | 1/2023 | Wouhaybi et al. | |
| 2023/0347924 A1 | 11/2023 | Koehler et al. | |
| 2024/0248836 A1 | 7/2024 | Ferreira et al. | |
| 2024/0386054 A1* | 11/2024 | Wouhaybi | H04L 45/16 |

OTHER PUBLICATIONS

Kohavi ("A Study of Cross-Validation and Bootstrap for Accuracy Estimation and Model Selection", 1995, International Joint Conference on Artificial Intelligence (IJCAI), all pages. (Year: 1995).*

Zhang et al, "Deep Reinforcement Learning Assisted Federated Learning Algorithm for Data Management of IIoT", 2020, IEEE Transactions on Industrial Informatics, pp. 1-10. (Year: 2020).*

(Continued)

*Primary Examiner* — Alexey Shmatov
*Assistant Examiner* — Clint Mullinax
(74) *Attorney, Agent, or Firm* — Workman Nydegger

(57) ABSTRACT

One example method includes determining a first test error for machine-learning (ML) models when the ML models are trained using a first dataset obtained from various near-edge nodes. A second test error is determined for the ML models when the ML models are trained using a second dataset obtained from a new near-edge node. A bootstrap error for each of the ML models is determined based on the first and second test errors. A convergence value for each of the ML models is determined when the ML models are trained using the first dataset. One of the plurality of ML models is automatically selected to deploy at the new near-edge node based on the bootstrap error and the convergence value for each of the ML models.

20 Claims, 9 Drawing Sheets

(56) References Cited

OTHER PUBLICATIONS

Ho et al, “Federated Deep Reinforcement Learning for Task Scheduling in Heterogeneous Autonomous Robotic System”, 2022, 2022 IEEE Global Communications Conference: IoT and Sensor Networks, pp. 1134-1139. (Year: 2022).*
Kaiyuan Gao et al., Multi-mobile Robot Autonomous Navigation System for Intelligent Logistics, 2018, [Retrieved on Sep. 9, 2024], Retrieved from the internet: <URL: https://ieeexplore.ieee.org/stamp/stamp.jsp?tp=&arnumber=8623343> 7 Pages (2603-2609) (Year: 2018).
Nakkiran, P., Neyshabur, B. and Sedghi, H., 2020. The Deep Bootstrap Framework: Good Online Learners are Good Offline Generalizers. arXiv preprint arXiv:2010.08127.

* cited by examiner

| | $M_1$ 410 | $M_2$ 420 | … | $M_z$ 430 |
|---|---|---|---|---|
| $D_{ideal}$ 340 | 0.05 | 0.07 | … | 0.04 |
| $D_{real}$ 530 | 0.07 | 0.13 | … | 0.14 |
| Bootstrap Error | 0.02 Keep | 0.06 Keep | … | 0.10 Discard |

*FIG. 5B*

| | $M_1$ 410 | $M_2$ 420 | … | $M_z$ 430 |
|---|---|---|---|---|
| $D_{ideal}$ 340 | 257 | 212 | … | |

*FIG. 5C*

BOOTSTRAP METHOD FOR CROSS-COMPANY MODEL GENERALIZATION ASSESSMENT

FIELD OF THE INVENTION

Embodiments of the present invention generally relate to logistics systems. More particularly, at least some embodiments of the invention relate to systems, hardware, software, computer-readable media, and methods for determining machine-learning (ML) models for near-edge nodes that join the logistics systems.

BACKGROUND

In the logistic space, a prominent edge domain is that of warehouse management and safety, where there are multiple edge-nodes such as forklifts and/or Autonomous Mobile Robots (AMR) having to make decisions in real time. The data collected from forklifts' or AMRs' trajectories at a given entities warehouse can be leveraged into Machine Learning (ML) models to optimize the operation of the forklifts and/or AMRs or to address dangerous operations, via event detection approaches. However, each warehouse operator is unique in handling load and equipment under its unique operational parameters.

A challenge an entity has when implementing a new warehouse is how to quickly train and then test ML models that are able to optimize the operation of the forklifts and/or AMRs that will be operating in the new warehouse. It may take the accumulation of a large dataset from the forklifts and/orAMRs before the ML models can be properly trained and tested. However, it usually requires the forklifts and/or AMRs to operate in a potentially less efficient manner while the datasets are being accumulated.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIGS. 5A-5C illustrate the central node of the logistics system of FIG. 2 automatically selecting a ML model for deployment in a new near-edge node;

DETAILED DESCRIPTION OF SOME EXAMPLE EMBODIMENTS

Figure 1:
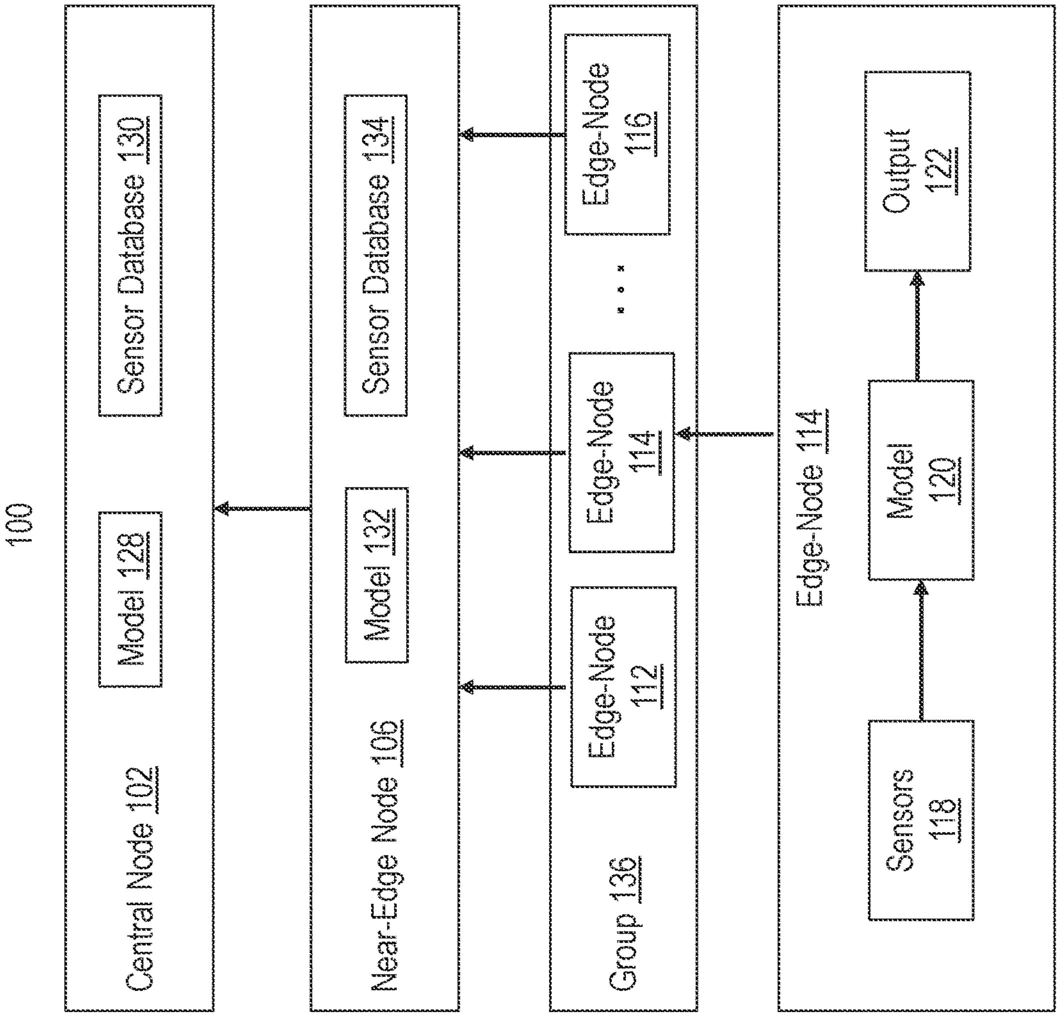
FIG. 1 illustrates an environment in which embodiments of the invention may be deployed or implemented.

Embodiments of the present invention generally relate to logistics systems. More particularly, at least some embodiments of the invention relate to systems, hardware, software, computer-readable media, and methods for determining machine-learning (ML) models for near-edge nodes that join the logistics systems.

In general, example embodiments of the invention provide for an environment where a central node provides compute and storage resources for a number of different customers. In particular, the central node provides training and testing for ML models that are configured to optimize the operation of the forklifts and/or AMRs that are operating in each warehouse of the different customer. This sharing or resources allows the central node to leverage the ML models trained on the group of different customers and their warehouses to be leveraged to help select the best ML model to be provided to new customers who join the shared environment. More concretely, given a new warehouse or customer, the embodiments disclosed herein provide the best possible initial ML model. That is, the ML model, of the ML models that have previously been trained, that is expected to have the best generalization capabilities when dealing with the new customer's/warehouse's data is automatically selected for use by the new customer. This process provides a technical advantage over existing systems as the new customer is able to quickly use the initial ML model for its forklifts and/or AMRs and achieve good results without having to wait for a large dataset to be accumulated before training the ML models as is done in existing systems. Although further training of the initial ML model can subsequently occur, the initial results are much better than would be expected if the new customer had to wait until the large dataset was accumulated, thus providing enhanced reliability to the operation of the warehouse of the new customer.

One example method includes determining a first test error for machine-learning (ML) models when the ML models are trained using a first dataset obtained from various near-edge nodes. A second test error is determined for the ML models when the ML models are trained using a second dataset obtained from a new near-edge node. A bootstrap error for each of the ML models is determined based on the first and second test errors. A convergence value for each of the ML models is determined when the ML models are trained using the first dataset. One of the plurality of ML models is automatically selected to deploy at the new near-edge node based on the bootstrap error and the convergence value for each of the ML models.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in anyway. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of an Example Architecture and Environment

FIG. 1 discloses aspects of an environment in which embodiments of the invention may be deployed or implemented. FIG. 1 illustrates a system (e.g., a logistics system) 100 that includes a central node 102 and a near-edge node 106. The near-edge node 106, for example, may be associated with a specific environment such as a warehouse and may operate with respect to a group 136 of edge-nodes such as the edge-nodes 112, 114, and 116, which also be referred to as far-edge nodes. In other embodiments, the edge-nodes 112, 114, and 116 need not be part of the group 136, but may function without being part of a group.

More specifically, the near-edge node 106 may be associated with a set or group 136 of nodes represented by the edge-nodes 112, 114, and 116. In this example, automated mobile robots (AMR) or forklifts (or the resources thereon) may be examples of the edge-nodes 112, 114, and 116.

The edge-node 114 further may include sensors 118 and a machine-learning (ML) model 120, which generates an inference or an output 122. The ML model 120 may be representative of one or multiple ML models. Each ML model may be able to detect a certain type of event using the same or similar input data from the sensors 118. The data generated by the sensors 118 may be stored as a sensor dataset.

In some examples, the data generated by the sensors 118 is provided to the central node 102, which may also have a copy of the ML model 120, represented as ML model 128. The near-edge node 106 may include a ML model 132 and sensor database 134. The near-edge node 106 may act as the central node 102 in some examples. The sensor database 134 may store sensor data received from all of the edge-nodes 112, 114, 116. Thus, the near-edge node 106 may store sensor data generated by the edge-nodes 112, 114, 116.

The central node 102 may store sensor data generated by the edge-nodes 112, 114, and 116 in the sensor database 130. The sensor database 130 may store the sensor data from the near-edge node 106 and/or other near-edge nodes when present, which may correspond to other environments, and which may be similarly configured. At the edge-node 114, only the recently generated data is generally stored. Local data may be deleted after transmission to the central node 102 and/or to the near-edge node 106. Inferences for a time t are generated using the most recent sensor data.

The central node 102 (e.g., implemented in a near edge infrastructure or in the cloud) may be configured to communicate with the edge-node 114. The communication may occur via the near-edge node 106. The communication may be performed using radio devices through hardware such as a router or gateway or other devices (e.g., the near-edge node 106). The edge-node 114 may also receive information from the central node 102 and use the information to perform various operations including logistics operations.

The sensors 118 may include position sensors and inertial sensors that generate positional data that determine a position or trajectory of an object in the environment. Positional data can be collected as time series data, which can be analyzed to determine a position of the forklift or AMR, a velocity of the forklift or AMR, a trajectory or direction or travel, a cornering, or the like. The inertial sensors allow acceleration and deceleration to be detected in multiple directions and axes.

In one example, a map of the environment is generated and may be stored at the central node 102 and/or at the near-edge node 106. The system may be configured to map the position data received from the nodes into a map of the environment. The edge-node 114 can determine its own position within the environment. The positions of all nodes (objects) can be determined with respect to each other and with respect to the environment.

The central node 102 may include a ML model 128 and the sensor database 130. The sensor database 130 may include a database for different sensor types. Thus, the sensor database 130 may include a position data database, an inertial database, and the like. In another example, the sensor database 130 may store all sensor data together and/or in a correlated form such that position data can be correlated to inertial data at least with respect to individual nodes and/or in time.

In one example, the local ML model 120 is trained at the central node 102 and deployed to the relevant edge-nodes 112, 114, and 116. The local ML model 120 is trained using available (historical) positioning and/or inertial measurement data (and/or other sensor data, which may include video data). After training, the local ML model 120 may be deployed to the nodes. In one example, the ML models 120 and 128 are the same. One difference is that the local ML model 120 may operate using locally generated data at the edge-node 114 as input while the ML model 128 may use data generated from multiple nodes in the multiple environments as input (e.g., the sensor data in the sensor database 130).

Figure 2:
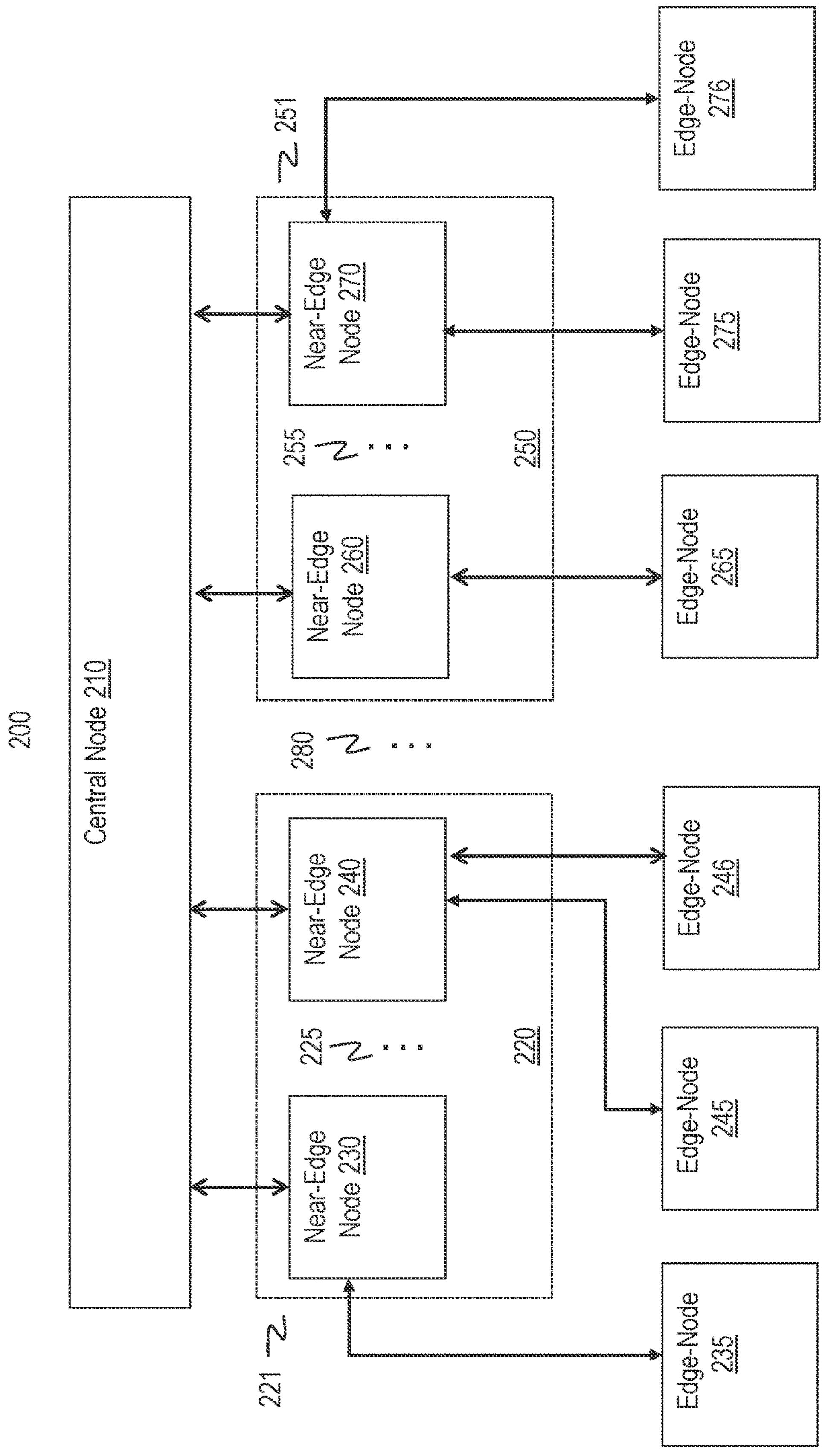
FIG. 2 illustrates a logistics system in which embodiments of the invention may be deployed or implemented.

FIG. 2 discloses aspects of an environment in which embodiments of the invention may be deployed or implemented. FIG. 2 illustrates a logistics system 200 that a central node 210, which may correspond to the central node 102, and near-edge nodes 230, 240, 260, 270 and any number of additional near-edge nodes as illustrated in the figure by the ellipses 280, which all may correspond to the near-edge node 106.

In the embodiment, the central node 210 may represent a large-scale computational environment with appropriate permission and connections to the near-edge nodes 230, 240, 260, 270, and potentially 280. In one embodiment, the central node 210 comprises local infrastructure for a core company or other similar entity to provide federated orchestration services to other organizations that own or otherwise are in control of the near-edge nodes.

For example, in the embodiment of FIG. 2, each near-edge node 230, 240, 260, 270, and 280 may represent a warehouse or other similar logistical environment. As represented by a dashed line 221, the near-edge nodes 230 and 240 may be under the control of an entity 220. As illustrated by the ellipses 225, the entity 220 may also control any number of additional near-edge nodes. Likewise, as represented by a dashed line 251, the near-edge nodes 260 and 270 may be owned or otherwise under the control of an entity 250. As illustrated by the ellipses 255, the entity 220 may also control any number of additional near-edge nodes. The additional near-edge nodes 280 may be under the control of additional entities. The entities 220 and 250 and those entities that control the additional near-edge nodes 280 may be distinct companies, customers, or in partnership with the core company who owns or otherwise controls the central node 210, or alternatively, they may be business units of the core company. FIG. 2 shows that there is separation between the near-edge nodes of the different entities to ensure security and privacy when implementing the embodiments disclosed herein.

Each of the near-edge nodes 230, 240, 260, 270, and 280 is associated with one or more edge-nodes, which may correspond to the edge-nodes 112, 114, and 116 and thus may include the various sensors and ML models previously described. For example, the near-edge node 230 is associated with the edge-node 235, the near-edge node 240 is associated with the edge-nodes 245 and 246, the near-edge node 260 is associated with the edge-node 265, and the near-edge node 270 is associated with the edge-nodes 275 and 276. The additional near-edge nodes 280 may also be associated with any number of edge-nodes. It will be appreciated that in practice that each near-edge node may be associated with many edge-nodes and thus the edge-nodes that are shown are for ease of illustration only. The logistics system 200 may be used to implement the embodiments disclosed herein as will be explained in more detail to follow.

B. Aspects of Deep Bootstrap Framework

In this section, a discussion is made of explaining the idea of a Deep Bootstrap Framework to access generalization of ML models. In the Deep Bootstrap Framework, generalization is seen slightly different, as a modification on the classical view. In the classical view on generalization, equation 1 is often used:

$$\text{Test Error}(f_t) = \textit{TrainError}(f_t) + [\text{Test Error}(f_t) - \textit{TrainError}(f_t)] \quad \text{Equation 1}$$

where [Test Error($f_t$)−TrainError($f_t$)] is the generalization gap and ($f_t$) is a deep neural network after t optimization steps. There are two issues with this view: (1) Modern methods reach TrainError≈0 while still performing well, thus, this equation reduces to analyzing Test Error; and (2) most techniques for understanding the generalization gap either remain vacuous or non-predictive.

The Deep Bootstrap Framework uses equation 2 to access generalization of ML models:

$$\text{Test Error}(f_t) = \textit{TrainError}(f_t^{iid}) + [\text{Test Error}(f_t) - \textit{TrainError}(f_t^{iid})] \quad \text{Equation 2}$$

with $$f_t^{iid}$$

having the same training as $f_t$ but trained on fresh samples at each mini-batch. That is, $$f_t^{iid}$$

optimizes what is called the population loss, while $f_t$ optimizes the empirical loss.

The Deep Bootstrap Framework is further conceptualized by introducing what is referred to as the "Real World" and "Ideal World". The Real World is where the ML model is trained while seeing the same sample more than once. In the Ideal World, the ML model never sees the same sample more than once (in the limit, it is training on an infinite data regime). The training done in the Real World is also called offline learning and the training done in the Ideal World is also called online learning.

The Deep Bootstrap Framework looks at two things: (1) how quickly ML models optimize in the Ideal World (infinite data regime), and (2) how close are the ML models in Ideal World versus Real World: referred to as "the bootstrap error". The bootstrap error is given by $$[\text{Test Error}(f_t) - \textit{TrainError}(f_t^{iid})].$$

The Deep Bootstrap Framework provides the following insights: (1) the generalization of ML models in offline learning is largely determined by their optimization speed in online learning, (2) the same techniques (architectures and training methods) are used in practice in both over- and under-parameterized regimes, and (3) instead of directly trying to characterize which empirical minima SGD reaches, it may be sufficient to study why SGD optimizes quickly on the population loss. Finally, in the Deep Bootstrap Framework the ideal world can be represented by a very large dataset that generally ensures that the same samples are never seen twice.

C. Framework for Determining A ML Model to Deploy

The embodiments disclosed herein provide for a new framework for identifying the best ML model architecture for a new entity/warehouse joining the logistics system 200, where the logistics system 200 may be implemented as a Machine Learning as a service environment. In particular, the embodiments disclosed herein focus on the domain of event detection of AMRs and forklifts as edge-nodes when the near-edge nodes are warehouses or other similar logistics environments.

The new framework leverages the Deep Bootstrap Framework discussed above, but adds additional features to the Deep Bootstrap Framework. In the embodiments, the error of the target ML model (i.e., the generalization error) can be estimated using the error of a pre-trained ML model's metadata. The error of each one of the pre-trained ML models are an "ideal world" scenario since they are trained on a very large amount of data collected from many AMRs and forklifts as edge-nodes operating at many different warehouses as near-edge nodes. On the other hand, the data collected from the new entity's warehouse represents the "Real World" scenario. Thus, the embodiments disclosed herein determine the ML model architecture that minimizes the difference between the decay of the loss between the pre-trained and new ML models.

The framework of the embodiments disclosed herein has two stages: pre-Ideal World and post-Ideal World, both of which will be explained in more detail to follow. In the pre-Ideal World stage data is accumulated at the central node so as to reach an Ideal World scenario. In this stage, training is still performed on the ML models, but without using any bootstrap method. In the post-Ideal World, enough data is accumulated at the central node to consider it an Ideal World and ML models are considered for deployment using the bootstrap method.

C1. Pre-Ideal World

Figure 3:
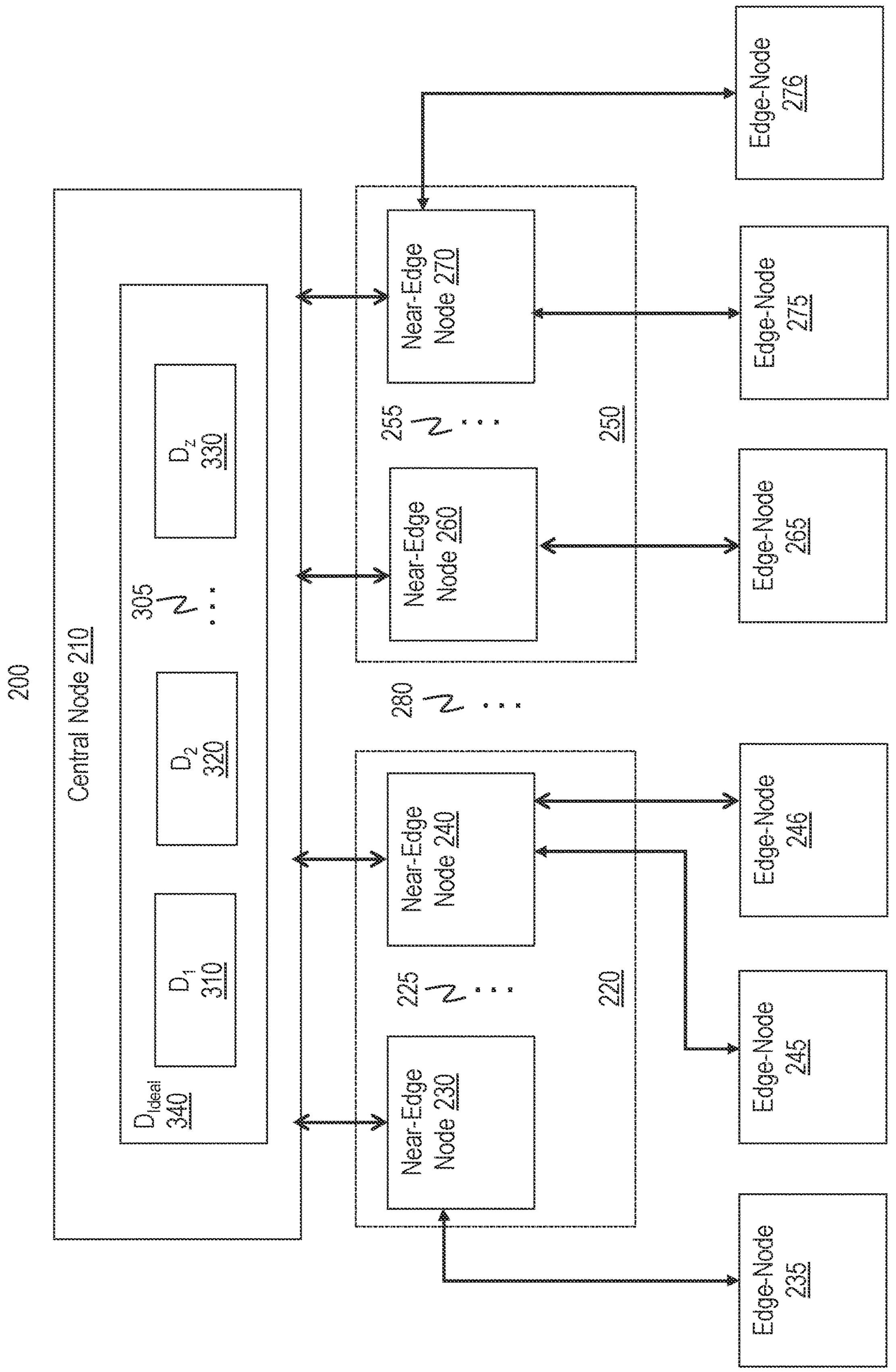
FIG. 3 illustrates a central node of the logistics system of FIG. 2 obtaining datasets from near-edge nodes.

FIG. 3 illustrates an embodiment of the logistics system 200 operating during an accumulation phase of the pre-Ideal World stage. As illustrated in FIG. 3, during the accumulation phase, the near-edge nodes 230, 240, 260, 270, and 280 perform the gathering of various datasets of sensor and event data from each of the edge-nodes that are associated with each near-edge node. The gathered datasets are then provided by the near-edge nodes to the central node 210. For example, each near-edge node may collect and then provide a dataset $D_1$ denoted at 310, a dataset $D_2$ denoted at 320, and as illustrated by the ellipses 305, up to a dataset $D_z$ denoted at 330 to the central node 210. In other words, the process of collecting and providing the datasets to the central node 210 is an iterative process where whenever new datasets are obtained from the edge-nodes, the new datasets are collected by the near-edge nodes and provided to the central node 210.

The various datasets are then accumulated by the central node 210 into a dataset $D_{Ideal}$, which is denoted at 340 and that comprises the joining of the datasets $D_1$ 310, $D_2$ 320, . . . , $D_z$ 330 obtained from the near-edge nodes. The purpose of the iterative process is to is to obtain an approximation of an infinite "Ideal World" dataset by obtaining a sufficiently large enough dataset where no two samples are likely to been seen twice during ML model training. Thus, the iterative process shown in FIG. 3 should be continuous so that that a large enough dataset can be obtained. Given that there will typically be a large number of entities and their related near-edge nodes associated with the central node 210, the iterative process is unlikely to be burdensome to the entities 220, 250, and any entities that control the near-edge nodes 280.

Figure 4A:
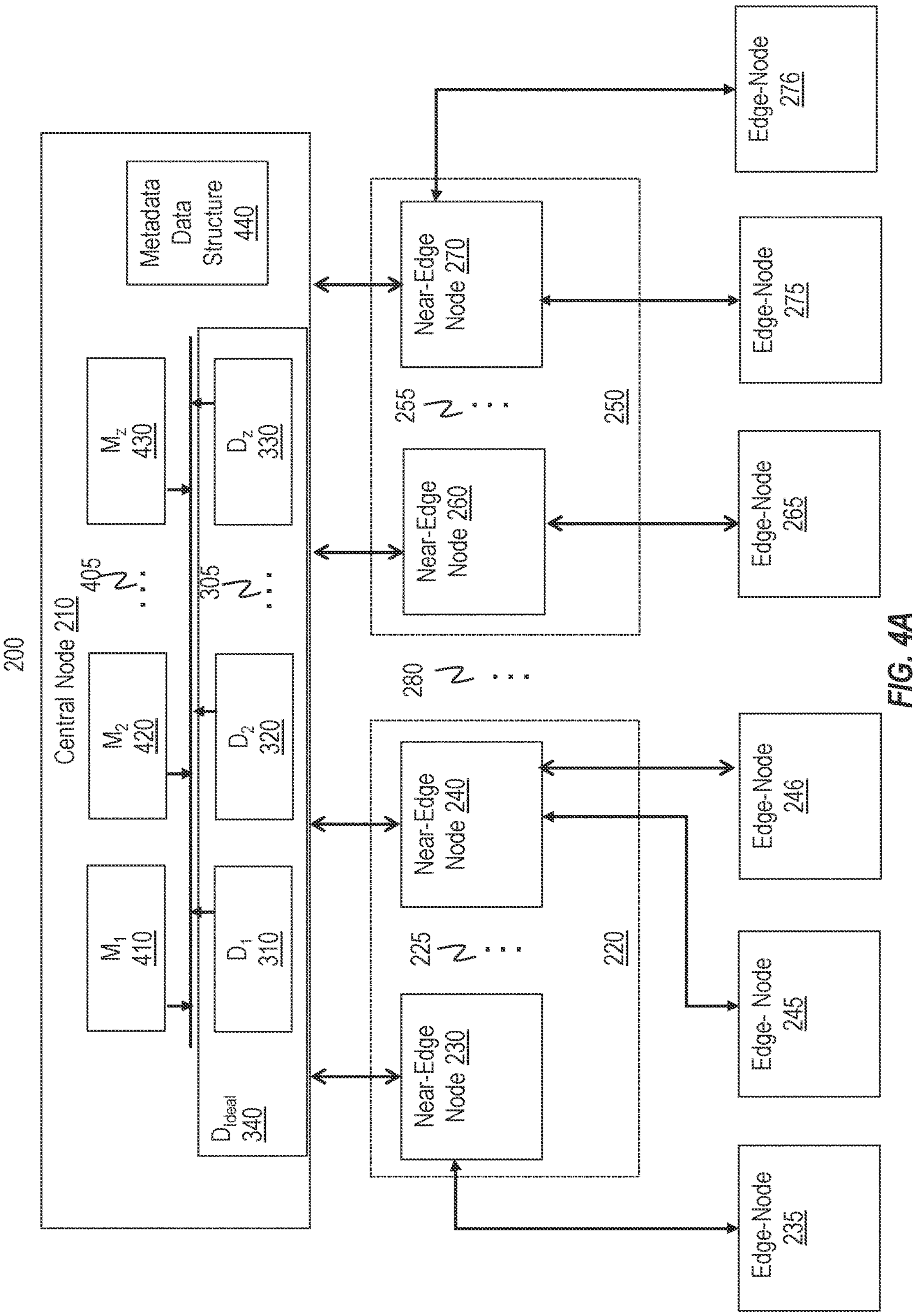
FIGS. 4A and 4B illustrate the central node of the logistics system of FIG. 2 training and testing ML models using the obtained datasets.

FIG. 4A illustrates an embodiment of the logistics system 200 operating during the pre-Ideal World stage as the system accumulates and trains various ML models for use at near-edge nodes and their associated edge-nodes. As shown in FIG. 4A, the central node obtains various ML models for training. As illustrated, the ML models include a ML model $M_1$ denoted at 410, a ML model $M_2$ denoted at 420, and as illustrated by the ellipses 405, up to a ML model $M_z$ denoted at 430.

The initial ML model architectures for the ML models $M_1$ 410, $M_2$ 420, . . . , $M_z$ 430 can be obtained by various methods known to those of skill in the art and may be domain-dependent. For example, these ML model architectures may be adapted from similar domains, if applicable, or defined and chosen by domain experts skilled in the art. Different methods for obtaining an initial set of ML model architectures may apply.

The central node 210 then proceeds to train all of the ML models $M_1$ 410, $M_2$ 420, . . . , $M_z$ 430 using the datasets $D_1$ 310, $D_2$ 320, . . . , $D_z$ 330 obtained from the near-edge nodes. It will be noted that because the central node 210 may not yet have accumulated a large enough dataset $D_{Ideal}$ 340 to approximate the "Ideal World", the central node 210 does not wait to begin training the ML models, but instead uses the datasets $D_1$ 310, $D_2$ 320, . . . , $D_z$ 330 that have been obtained up to that time.

As illustrated in FIG. 4A, the central node 210 includes metadata data structure 440. The metadata data structure 440, in some embodiments, may be an indexing data structure where training and testing metadata for a given near edge and ML model architecture are stored and retrievable.

This metadata can be leveraged for active ML model management. For example, the metadata associating datasets and ML models can be considered to perform the tentative deployment of ML models to entities that newly join the logistics system 200, choosing the ML models that are most-generalized. Thus, the deployment of the most-generalized ML model to the new entries may take place even before the approximation for the Ideal World is obtained.

The determination of a most-generalized ML model from a set of ML models such as ML models $M_1$ 410, $M_2$ 420, . . . , $M_z$ 430 will consider the performance achieved by the resulting ML model of that architecture when trained with one or more datasets or combinations of datasets $D_1$ 310, $D_2$ 320, . . . , $D_z$ 330. The most-appropriate method for determining the most-generalized ML model may vary depending on the domain and on the nature of the datasets. Thus, any reasonable method may be used for making this determination.

In one embodiment, a method for determining the most-generalized ML model could be determining the ML model architecture with a good enough performance above a parametrized threshold t for a maximum number of datasets $D_1$ 310, $D_2$ 320, . . . , $D_z$ 330. Such an embodiment is shown in FIG. 4B, which also illustrates an embodiment of the metadata data structure 440.

Figure 4B:
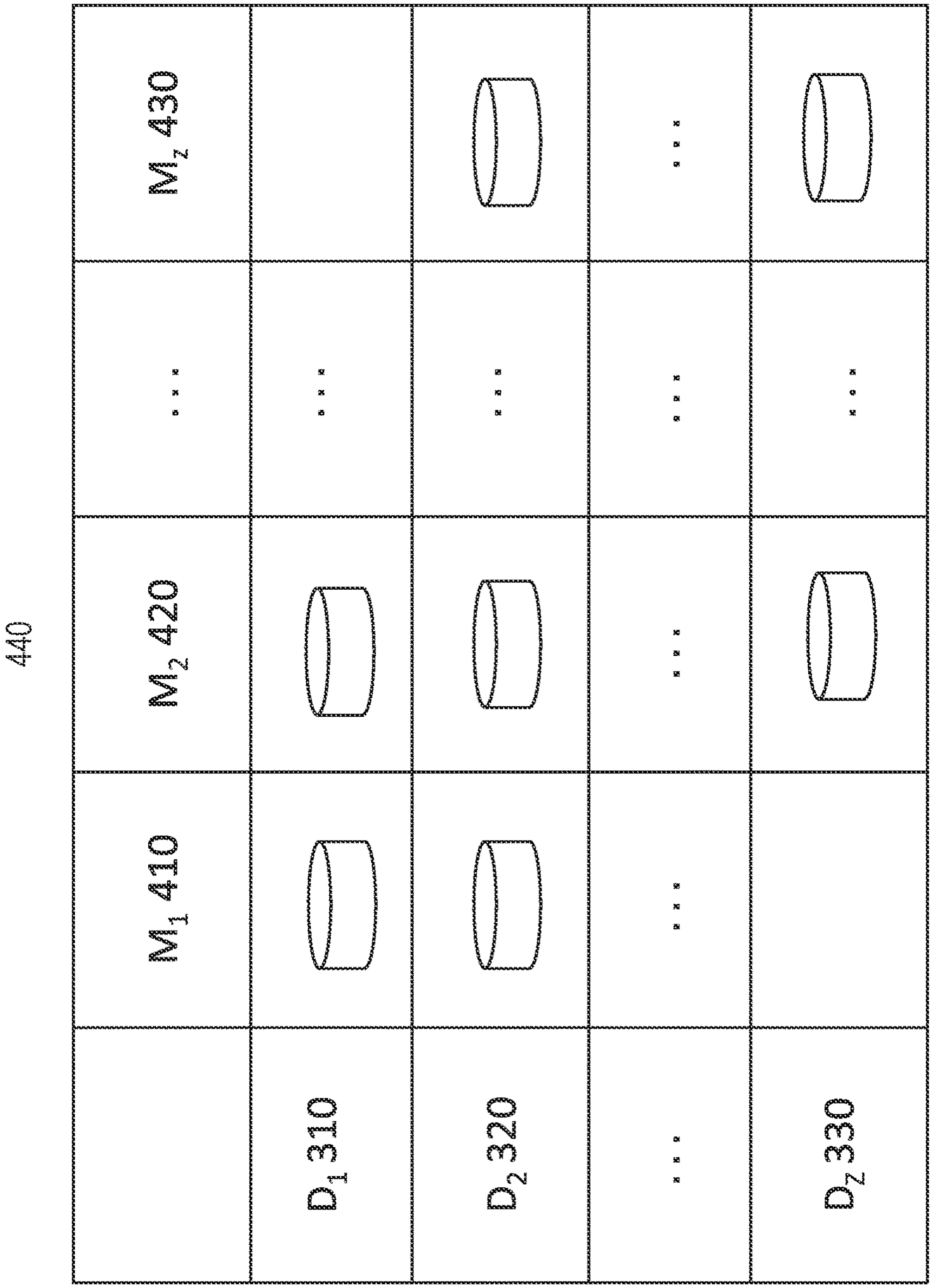

As shown in FIG. 4B, the indications in the metadata structure shown represent that an ML model $M_i$, when trained and tested with dataset $D_j$, achieves an accuracy above a predetermined threshold t. For example, when the ML model $M_1$ 410 is trained and tested using the datasets $D_1$ 310 and $D_2$ 320, the ML model architecture achieves an accuracy above the predetermined threshold t and an indication is made in the metadata data structure 440. However, when the ML model $M_1$ 410 is trained and tested using the dataset $D_z$ 330, the ML model architecture does not achieve an accuracy above the predetermined threshold t and so no indication is made in the metadata data structure 440. Likewise, when the ML model $M_2$ 420 is trained and tested using the datasets $D_1$ 310, $D_2$ 320, . . . , $D_z$ 330, the ML model architecture achieves an accuracy above the predetermined threshold t and an indication is made in the metadata data structure 440. Further, when the ML model $M_z$ 430 is trained and testes using the datasets $D_2$ 320 and $D_z$ 330, the ML model architecture achieves an accuracy above the predetermined threshold t and an indication is made in the metadata data structure 440. However, when the ML model $M_z$ 430 is trained and tested using the dataset $D_1$ 310, the ML model architecture does not achieve an accuracy above the predetermined threshold t and so no indication is made in the metadata data structure 440. Accordingly, in this embodiment the most-generalized ML model would be ML model $M_2$ 420 as its architecture achieves reasonable performance for a majority of the ML models.

Alternative methods may also be applied. A method may alternatively consider a pondered weighted value for each dataset, depending on the number of samples or on a distribution of the data (instead of only considering if it is above or below a threshold). Another alternative still may consider, for example, the level of accuracy and/or generalization achieved by a ML model architecture trained with a dataset but tested in other datasets. Also, if some datasets from the near-edge nodes of the new entity are available, the method for determining the most-generalized ML model may leverage a comparison of the distribution of those datasets with the distributions of the known datasets, favoring ML model architectures that perform best for datasets with a more similar distribution. It will be appreciated that combinations of the above discussed methods may also apply.

Hence, prior to obtaining a large enough dataset to be considered an Ideal World, the logistics system 200 is still able to accumulate datasets, train ML model architectures, expand the known ML model architectures, and tentatively select a most-generalized ML model architecture for the near-edge nodes of the new entities.

C2. Post Ideal World

The logistics system 200 enters the post-Ideal World phase once the central node 210 has accumulated enough datasets from the near-edge nodes 230, 240, 260, 270, and 280 to generate the dataset $D_{Ideal}$, 340 to approximate the "Ideal World". In this phase, the central node 210 is able to use the Deep Bootstrap Framework to enhance the determination of which ML model would be the best for a new entity to use. It will be noted that in this phase, the central node 210 and the various near-edge nodes do not necessarily stop gathering datasets. However, it will be appreciated that the dataset $D_{Ideal}$ 340 will include the minimum amount of data that is needed to consider dataset $D_{Ideal}$ 340 an Ideal World dataset.

Figure 5A:
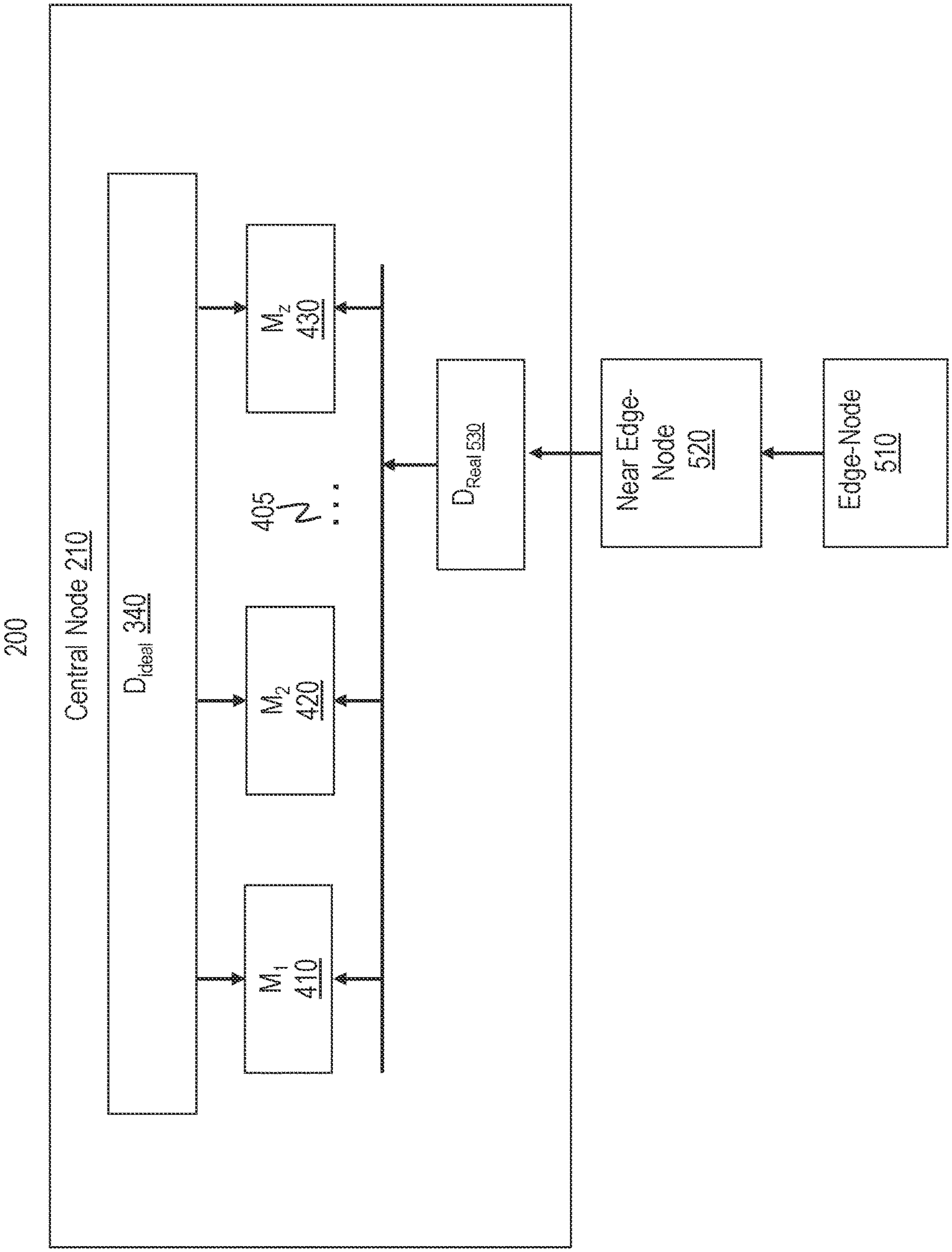

FIG. 4A illustrates an embodiment of the logistics system 200 operating during the post-Ideal World phase. It will be noted that for ease of illustration, not all the elements of the logistics system 200 are shown in FIG. 5A. In post-Ideal World phase, the first step is to train all stored ML models $M_1$ 410, $M_2$ 420, . . . , $M_z$ 430 using the dataset $D_{Ideal}$ 340. In addition to storing metadata related to timestamps and ML model architecture versions, the central node 210 stores information on the training loss and validation loss curves for each of the ML models $M_1$ 410, $M_2$ 420, . . . , $M_z$ 430 trained using the dataset $D_{Ideal}$ 340.

As shown in FIG. 5A, a new near-edge node 520 that requires a new ML model has joined the logistics system 200. The new near-edge node 520, which may correspond to the previously described near-edge nodes, receives sensor and event data from an edge-node 510, which may correspond to the previously described edge-nodes. Rather than make the near-edge node 520 wait until it has enough datasets to determine and train a ML model, the embodiments disclosed herein leverage the ML models known to the system to select a ML model that is likely the best for the near-edge node based on the type of sensor and event data being received by the near-edge node 520 from the edge-node 510. The selected ML model can then be at least initially used by the near-edge node 520 to control the operations of the edge-nodes 510.

The near-edge node 520 provides various datasets that comprise the sensor and event data from the edge-node 510 to the central node 210. The central node 210 may start indexing the datasets provided by the near-edge node 520 until a satisfactory dataset size is accumulated as a dataset $D_{Real}$ denoted at 530. It will be appreciated that the dataset $D_{Real}$ 530 will typically be smaller than the dataset $D_{Ideal}$ 340 since the dataset is generated from a much smaller number of near-edge nodes. The central node 210 may then train the ML models $M_1$ 410, $M_2$ 420, . . . , $M_z$ 430 using the dataset $D_{Real}$ 530.

Accordingly, the central node 210 trains the ML models $M_1$ 410, $M_2$ 420, . . . , $M_z$ 430 using the dataset $D_{Ideal}$ 340 (the Ideal World) and using the dataset $D_{Real}$ 530 (the Real World). It is then possible for the central node 210 to compare the bootstrap error and process a training loss curve of each ML model $M_1$ 410, $M_2$ 420, . . . , $M_z$ 430 on the Ideal World and on the Real World to determine the best ML model for the near-edge node 520. When determining the best ML model for the near-edge node 520, the central node 210 considers (1) which ML models have a bootstrap error less than a small epsilon and (2) which ML model has the fastest Ideal World convergence.

The bootstrap error is calculated in relation to a triple: $(D_i D_r M_j)$:an Ideal World dataset $D_i$, a Real World dataset $D_r$, and a model $M_j$. The ML model should have been trained and tested on both the Ideal and Real Worlds. The central node 210 then looks at two quantities: $D_{i_M}$ $$D_{i_{M_j}}^{Test} \text{ and } D_{r_{M_j}}^{Test},$$

respectively the test error of model $M_i$ trained and tested using the Ideal World dataset, and respectively the test error of model $M_i$ trained and tested using the Real World dataset. The bootstrap error for $(D_i D_r M_j)$ is:

$$BE_{M_j}^{D_i D_r} = D_{r_{M_j}}^{Test} - D_{i_{M_j}}^{Test} \qquad \text{Equation 3}$$

In the embodiment, $$BE_{M_j}^{D_i D_r}$$

should be small for a ML model to be considered a good candidate. Therefore, the central node 210 sets a threshold $$Be_{M_j}^{DiDr} \leq \epsilon;$$

if a ML model architecture $M_j$ has $$BE_{M_j}^{D_i D_r} > \epsilon,$$

it is discarded. The central node 210 the considers all non-discarded ML model architectures to evaluate their training loss curve on the Ideal World. The central node 210 defines a measure of convergence as the epoch at which a ML model architecture achieved at least 101% of its minimum training loss. Finally, the central node 210 automatically chooses or selects the ML model architecture with the smallest convergence epoch as the best candidate to deploy to the near-edge node 520.

Thus, there are two main steps when processing the joining near-edge node 520: (1) calculating the bootstrap error for each ML model $M_1$ 410, $M_2$ 420, . . . , $M_z$ 430, and (2) calculating the convergence cycle for each ML model $M_1$ 410, $M_2$ 420, . . . , $M_z$ 430 on the Ideal World. FIG. 5B illustrates an embodiment of calculating the bootstrap error for each ML model $M_1$ 410, $M_2$ 420, . . . , $M_z$ 430. As discussed above when the bootstrap error for a given ML model is above the threshold $\in$, the ML model is discarded, and the second step is not taken for that ML model. In the embodiment of FIG. 5B, suppose the threshold $\in$ is set to be 0.08 for purposes of explanation.

As illustrated in FIG. 5B, a test error for each ML model $M_1$ 410, $M_2$ 420, . . . , $M_z$ 430 is calculated using both the dataset $D_{Ideal}$, 340 and the dataset $D_{Real}$, 530. As shown in the figure, the test error for the ML model $M_1$ 410 calculated using dataset $D_{Ideal}$ 340 is 0.05 and calculated using dataset $D_{Real}$ 530 is 0.07. The bootstrap error is then calculated to be 0.02 by taking the difference between test errors. Likewise, the test error for the ML model $M_2$ 420 calculated using dataset $D_{Ideal}$ 340 is 0.07 and calculated using dataset $D_{Real}$, 530 is 0.13. The bootstrap error is then calculated to be 0.06 by taking the difference between test errors. Since the calculated bootstrap error is less than the threshold $\in$ of 0.08, both the ML models $M_1$ 410 and $M_2$ 420 are not discarded and will move to the next step.

As also shown in FIG. 5B, the test error for the ML model $M_z$430 calculated using dataset $D_{Ideal}$ 340 is 0.04 and calculated using dataset $D_{Real}$ 530 is 0.14. The bootstrap error is then calculated to be 0.10 by taking the difference between test errors. Since the calculated bootstrap error is more than the threshold $\in$ of 0.08, the ML model $M_z$430 is discarded and does not move onto the next step. That is, since the bootstrap error is more than the threshold, the ML model $M_z$ 430 is not likely to perform well using the datasets of the near-edge node 520. Thus, the bootstrap error acts as a qualifying criterion that filters out any ML models who have an architecture that is not configured for the types of datasets of the near-edge node 520.

FIG. 5C illustrates the calculation of the convergence cycle using dataset $D_{Ideal}$ 340 of those ML models who bootstrap error was less than the threshold $\in$. The convergence cycle calculation evaluates a training loss curve for each ML model and then determines the epoch at which all non-discarded ML models achieved at least 101% of its minimum training loss based on the training loss curve. As shown in FIG. 5C, the calculation of the convergence cycle of the ML model $M_1$ 410 is 257 and the calculation of the convergence cycle of the ML model $M_2$ 420 is 212. Since the ML model $M_z$430 was discarded, a convergence cycle calculation is not performed for this ML model, and it is left blank in FIG. 5C for illustration purposes. Accordingly, the ML model $M_2$ 420 has the smallest convergence epoch and thus is determined to be the best ML model to deploy at the near-edge node 520.

It will be noted that the ML model $M_2$ 420 had a larger bootstrap error than the ML model $M_1$ 410. However, once the bootstrap errors have been determined and the ML models who have bad performance are discarded, the convergence cycle calculation becomes the deciding factor. Thus, the convergence cycle calculation acts as a ranking criterion, with the smallest convergence epoch belonging to the ML model that is likely to have the best performance for the datasets of the near-edge node 520.

In some embodiment, the calculation of the convergence cycle for each ML model on the Ideal World can be pre-calculated for every known ML model architecture. It is also possible to pre-calculate the test error of each known ML model architecture on the Ideal World dataset. Then, when the near-edge node 520 joins the logistics system 200, the central node 210 only needs to calculate the test error on the Real World dataset for every known ML model architecture. It is then possible to perform the steps described above to find the best ML model architecture for the near-edge node 520. This approach may advantageously speed up the determination process as less computation resources will be needed at the time the near-edge node 520 joins since all the Ideal World calculations have previously been performed.

D. Example Methods

Figure 6:
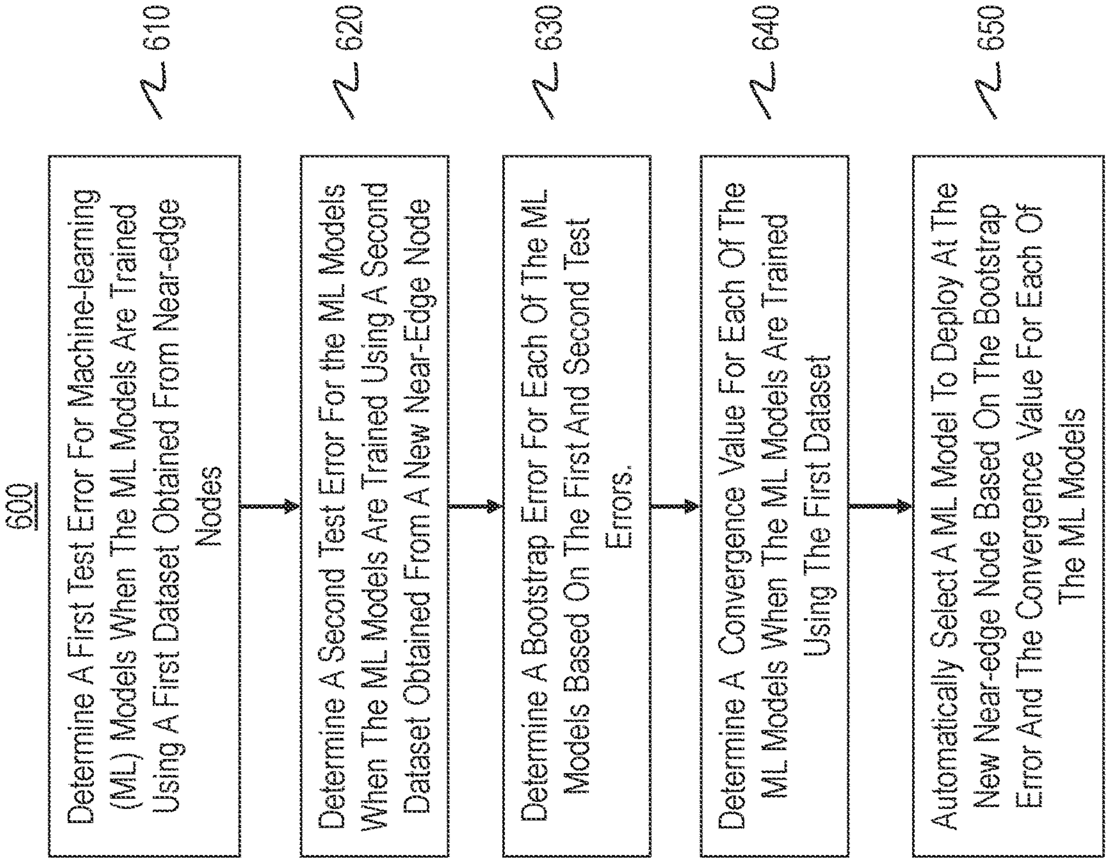
FIG. 6 illustrates a flowchart of an example method for automatically selecting a ML model for deployment in a new near-edge node.

It is noted with respect to the disclosed methods, including the example method of FIG. 6, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 6, an example method 600 for a central node to automatically select a ML model for a new near-edge node is disclosed. The method 600 will be described in relation to one or more of the figures previously described, although the method 600 is not limited to any particular embodiment.

The method 600 includes determining a first test error for each of a plurality of machine-learning (ML) models when the ML models are trained using a first dataset, the first dataset comprising a joining of a plurality of datasets obtained from a plurality of near-edge nodes, the plurality of ML models being configured to control one or more edge-nodes that are associated with each of the plurality of near-edge nodes (610). For example, as previously described the central node 210 determines a test error $$D^{Test}_{iM_j}$$

for each of the each ML model $M_1$ 410, $M_2$ 420, . . . , $M_z$ 430 using the dataset $D_{Ideal}$ 340. The dataset $D_{ideal}$ 340 comprises a joining of the datasets $D_1$ 310, $D_2$ 320, . . . , $D_z$ 330 that are obtained from the near-edge nodes 230, 240, 260, 270, and 280. The ML models $M_1$ 410, $M_2$420, . . . , $M_z$ 430 are configured to control the edge-nodes 235, 245, 246, 265, 275, and 276.

The method 600 includes determining a second test error for each of the plurality of ML models when the plurality of ML models are trained using a second dataset, the second dataset comprising a dataset obtained from a new near-edge node that is not part of the plurality of near-edge nodes (620). For example, as previously described the central node 210 determines the test error $$D^{Test}_{rM_j}$$

for each of the each ML model $M_1$ 410, $M_2$ 420, . . . , $M_z$ 430 using the dataset $D_{Real}$ 530. The dataset $D_{Real}$ 530 comprises datasets obtained from the new near-edge node 520.

The method 600 includes determining a bootstrap error for each of the plurality of ML models based on the first and second test errors (630). For example, as previously described the central node 210 determines bootstrap error using equation 3.

The method 600 includes determining a convergence value for each of the plurality of ML models when the ML models are trained using the first dataset (640). For example, as previously described the central node 210 determines the convergence value in the manner previously described.

The method 600 includes automatically selecting one of the plurality of ML models to deploy at the new near-edge node based on the bootstrap error and the convergence value for each of the plurality of ML models (650). For example, as previously described the central node 210 automatically selects a ML model to be deployed at the near-edge node 520 in the manner previously described.

E. FURTHER EXAMPLE EMBODIMENTS

Following are some further example embodiments of the invention. These are presented only by way of example and are not intended to limit the scope of the invention in any way.

Embodiment 1

A method, comprising: determining a first test error for each of a plurality of machine-learning (ML) models when the ML models are trained using a first dataset, the first dataset comprising a joining of a plurality of datasets obtained from a plurality of near-edge nodes, the plurality of ML models being configured to control one or more edge-nodes that are associated with each of the plurality of near-edge nodes; determining a second test error for each of the plurality of ML models when the plurality of ML models are trained using a second dataset, the second dataset comprising a dataset obtained from a new near-edge node that is not part of the plurality of near-edge nodes; determining a bootstrap error for each of the plurality of ML models based on the first and second test errors; determining a convergence value for each of the plurality of ML models when the ML models are trained using the first dataset; and automatically selecting one of the plurality of ML models to deploy at the new near-edge node based on the bootstrap error and the convergence value for each of the plurality of ML models.

Embodiment 2

The method of embodiment 1, further comprising: comparing the bootstrap error for each of the plurality of ML models to a threshold value; and discarding those ML models that have a bootstrap error that is larger than the threshold value.

Embodiment 3

The method of embodiments 1-2, wherein determining a bootstrap error for each of the plurality of ML models based on the first and second test errors comprises: calculating a difference between the second test error and the first test error.

Embodiment 4

The method of embodiments 1-3, wherein the plurality of near-edge nodes are a warehouse.

Embodiment 5

The method of embodiment 4, wherein the plurality of near-edge nodes receive the plurality of datasets comprising the first dataset from the one or more edge-nodes that operate in the warehouse.

Embodiment 6

The method of embodiment 5, wherein the plurality of edge-node comprise one of a forklift or an Autonomous Mobile Robot (AMR) that operate in the warehouse.

Embodiment 7

The method of embodiment 6, wherein the plurality of datasets comprising the first dataset comprise sensor data or event data of the forklifts or AMR.

Embodiment 8

The method of embodiments 1-7, wherein: the new near-edge node is a warehouse, the new near-edge node receives the second dataset from one or more edge-nodes that operate in the warehouse, and the one or more edge-nodes comprise one of a forklift or an Autonomous Mobile Robot.

Embodiment 9

The method of embodiments 1-8, wherein determining a convergence value for each of the plurality of ML models when the ML models are trained using a first dataset comprises: evaluating a training loss curve for each of the plurality of ML models; and determining a convergence value based on the training loss curve.

Embodiment 10

The method of embodiments 1-9, wherein the selected ML model that is deployed at the new near edge node is used to control the operation of one or more edge-nodes associated with the new near-edge node.

Embodiment 11

A system, comprising hardware and/or software, operable to perform any of the operations, methods, or processes, or any portion of any of these, disclosed herein.

Embodiment 12

A non-transitory storage medium having stored therein instructions that are executable by one or more hardware processors to perform operations comprising the operations of any one or more of embodiments 1-10.

F. Example Computing Devices and Associated Media

Finally, because the principles described herein may be performed in the context of a computing system some introductory discussion of a computing system will be described with respect to FIG. 7. Computing systems are now increasingly taking a wide variety of forms. Computing systems may, for example, be hand-held devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 7:
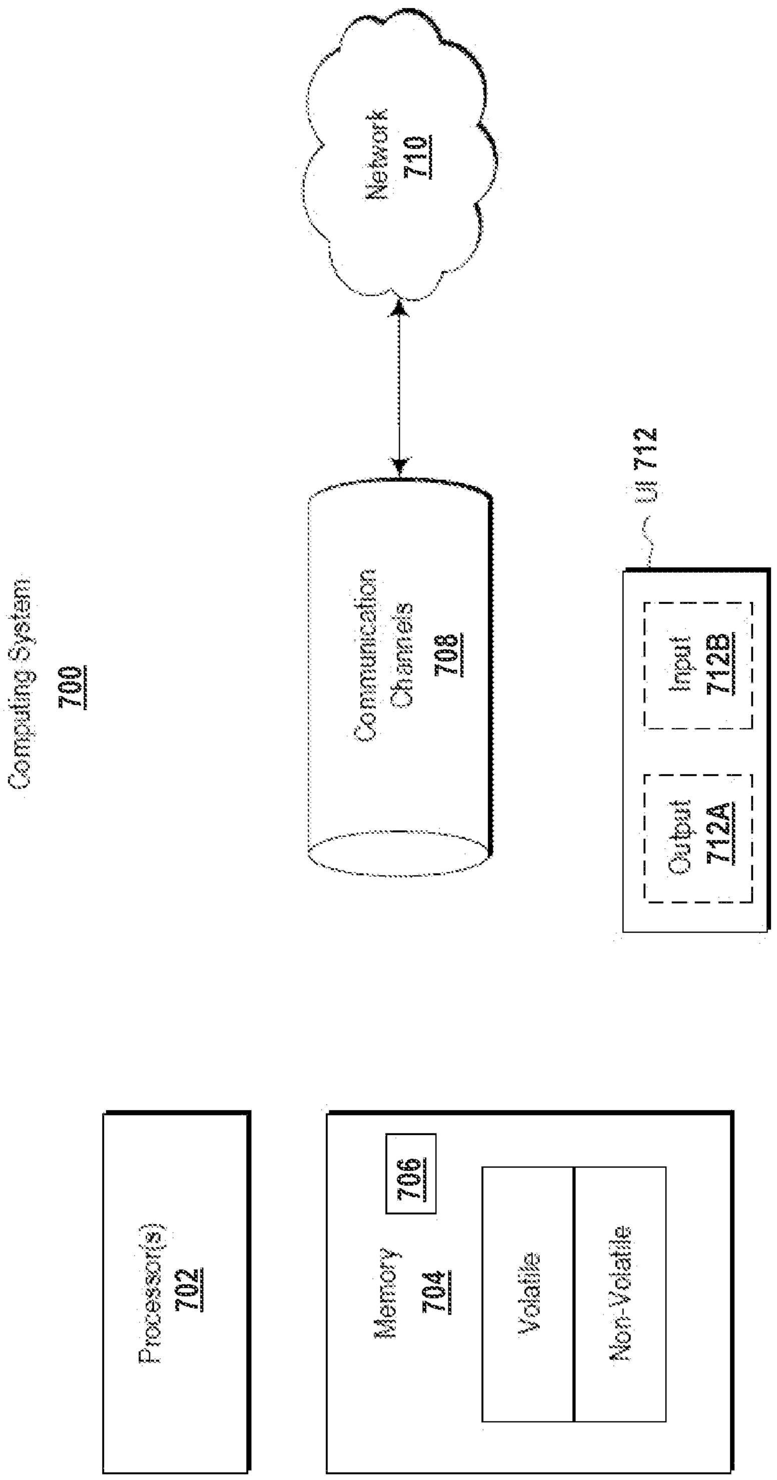
FIG. 7 illustrates an example computing system in which the embodiment described herein may be employed.

As illustrated in FIG. 7, in its most basic configuration, a computing system 700 typically includes at least one hardware processing unit 702 and memory 704. The processing unit 702 may include a general-purpose processor and may also include a field-programmable gate array (FPGA), an application-specific integrated circuit (ASIC), or any other specialized circuit. The memory 704 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 700 also has thereon multiple structures often referred to as an "executable component". For instance, memory 704 of the computing system 700 is illustrated as including executable component 706. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, which are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent," "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description above, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied in one or more computer-readable media that form a computer program product. An example of such an operation involves the manipulation of data. If such acts are implemented exclusively or near-exclusively in hardware, such as within an FPGA or an ASIC, the computer-executable instructions may be hardcoded or hard-wired logic gates. The computer-executable instructions (and the manipulated data) may be stored in the memory 704 of the computing system 700. Computing system 700 may also contain communication channels 708 that allow the computing system 700 to communicate with other computing systems over, for example, network 710.

While not all computing systems require a user interface, in some embodiments, the computing system 700 includes a user interface system 712 for use in interfacing with a user. The user interface system 712 may include output mechanisms 712A as well as input mechanisms 712B. The principles described herein are not limited to the precise output mechanisms 712A or input mechanisms 712B as such will depend on the nature of the device. However, output mechanisms 712A might include, for instance, speakers, displays, tactile output, holograms, and so forth. Examples of input mechanisms 712B might include, for instance, microphones, touchscreens, holograms, cameras, keyboards, mouse or other pointer input, sensors of any type, and so forth.

Embodiments described herein may comprise or utilize a special purpose or general-purpose computing system, including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hard-wired, wireless, or a combination of hard-wired or wireless) to a computing system, the computing system properly views the connection as a transmission medium. Transmission media can include a network and/or data links that can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer-executable instructions may be, for example, binaries or even instructions that undergo some translation (such as compilation) before direct execution by the processors, such as intermediate format instructions such as assembly language or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, data centers, wearables (such as glasses) and the like. The invention may also be practiced in distributed system environments where local and remote computing systems, which are linked (either by hard-wired data links, wireless data links, or by a combination of hard-wired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing systems which may correspond to the computing system 700 previously described. The computing systems of the remaining figures include various components or functional blocks that may implement the various embodiments disclosed herein, as will be explained. The various components or functional blocks may be implemented on a local computing system or may be implemented on a distributed computing system that includes elements resident in the cloud or that implement aspect of cloud computing. The various components or functional blocks may be implemented as software, hardware, or a combination of software and hardware. The computing systems of the remaining figures may include more or less than the components illustrated in the figures, and some of the components may be combined as circumstances warrant. Although not necessarily illustrated, the various components of the computing systems may access and/or utilize a processor and memory, such as processing unit 702 and memory 704, as needed to perform their various functions.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

determining a first test error for each of a plurality of machine-learning (ML) models maintained at a central node when the ML models are trained using a first dataset, the first dataset comprising data samples aggregated into a single dataset from a plurality of distinct datasets each associated with a respective near-edge node, each of the plurality of distinct datasets corresponding to different operational environments and being combined at the central node such that the ML models are trained on the aggregated data samples, the plurality of ML models being configured to control the operation of one or more edge-nodes that are associated with each of the plurality of near-edge nodes;

determining a second test error for each of the plurality of ML models when the plurality of ML models are trained using a second dataset, the second dataset collected exclusively from a new near-edge node that is not part of the plurality of near-edge nodes that the first dataset was collected from and corresponding to a different operational environment than the operational environments represented in the first dataset;

determining a bootstrap error for each of the plurality of ML models by calculating a difference between the second test error and the first test error, the bootstrap error representing a difference in performance between training using the first dataset and training using the second dataset corresponding to the different operational environment, wherein the first test error and the second test error are obtained from separate training of each ML model using the first dataset and the second dataset, respectively;

determining a convergence value for each of the plurality of ML models as an epoch value derived from a training loss curve when the ML models are trained using the first dataset, wherein the convergence value corresponds to an earliest epoch at which a training loss reaches within a predefined percentage of a minimum training loss; and automatically selecting one of the plurality of ML models to deploy at the new near-edge node by excluding ML models having a bootstrap error exceeding a threshold value corresponding to a maximum allowable generalization degradation and selecting, from the remaining ML models, the ML model having a smallest convergence value, wherein the selecting is performed only from ML models that satisfy the threshold value, for deployment at the new near-edge node prior to accumulation of a sufficient training dataset at the new near-edge node.

2. The method of claim 1, wherein the threshold value is configurable based on a desired generalization tolerance for the new near-edge node.

3. The method of claim 1, wherein the training loss curve corresponds to a loss computed during iterative training of each of the plurality of ML model using the first dataset.

4. The method of claim 1, wherein the plurality of near-edge nodes are a warehouse.

5. The method of claim 4, wherein the plurality of near-edge nodes receive the plurality of datasets comprising the first dataset from the one or more edge-nodes that operate in the warehouse.

6. The method of claim 5, wherein the plurality of edge-nodes comprise one of a forklift or an Autonomous Mobile Robot (AMR) that operate in the warehouse.

7. The method of claim 6, wherein the plurality of datasets comprising the first dataset comprise sensor data or event data of the forklifts or AMR.

8. The method of claim 1, wherein:

the new near-edge node is a warehouse, the new near-edge node receives the second dataset from one or more edge-nodes that operate in the warehouse, and the one or more edge-nodes comprise one of a forklift or an Autonomous Mobile Robot.

9. The method of claim 1, wherein determining a convergence value for each of the plurality of ML models when the ML models are trained using the first dataset comprises:

evaluating the training loss curve for each of the plurality of ML models; and determining the epoch value based on the training loss curve.

10. The method of claim 1, wherein the selected ML model that is deployed at the new near-edge node is used to control an operation of one or more edge-nodes associated with the new near-edge node.

11. A non-transitory storage medium having stored therein instructions that are executable by one or more hardware processors to perform operations comprising:

determining a first test error for each of a plurality of machine-learning (ML) models maintained at a central node when the ML models are trained using a first dataset, the first dataset comprising data samples aggregated into a single dataset from a plurality of distinct datasets each associated with a respective near-edge node, each of the plurality of distinct datasets corresponding to different operational environments and being combined at the central node such that the ML models are trained on the aggregated data samples, the plurality of ML models being configured to control the operation of one or more edge-nodes that are associated with each of the plurality of near-edge nodes;

determining a second test error for each of the plurality of ML models when the plurality of ML models are trained using a second dataset, the second dataset collected exclusively from a new near-edge node that is not part of the plurality of near-edge nodes that the first dataset was collected from and corresponding to a different operational environment than the operational environments represented in the first dataset;

determining a bootstrap error for each of the plurality of ML models by calculating a difference between the second test error and the first test error, the bootstrap error representing a difference in performance between training using the first dataset and training using the second dataset corresponding to the different operational environment, wherein the first test error and the second test error are obtained from separate training of each ML model using the first dataset and the second dataset, respectively;

determining a convergence value for each of the plurality of ML models as an epoch value derived from a training loss curve when the ML models are trained using the first dataset, wherein the convergence value corresponds to an earliest epoch at which a training loss reaches within a predefined percentage of a minimum training loss; and automatically selecting one of the plurality of ML models to deploy at the new near-edge node by excluding ML models having a bootstrap error exceeding a threshold value corresponding to a maximum allowable generalization degradation and selecting, from the remaining ML models, the ML model having a smallest convergence value, wherein the selecting is performed only from ML models that satisfy the threshold value, for deployment at the new near-edge node prior to accumulation of a sufficient training dataset at the new near-edge node.

12. The non-transitory storage medium of claim 11, wherein the threshold value is configurable based on a desired generalization tolerance for the new near-edge node.

13. The non-transitory storage medium of claim 11, wherein the training loss curve corresponds to a loss computed during iterative training of each of the plurality of ML model using the first dataset.

14. The non-transitory storage medium of claim 11, wherein the plurality of near-edge nodes are a warehouse.

15. The non-transitory storage medium of claim 14, wherein the plurality of near-edge nodes receive the plurality of datasets comprising the first dataset from the one or more edge-nodes that operate in the warehouse.

16. The non-transitory storage medium of claim 15, wherein the plurality of edge nodes comprise one of a forklift or an Autonomous Mobile Robot (AMR) that operate in the warehouse.

17. The non-transitory storage medium of claim 16, wherein the plurality of datasets comprising the first dataset comprise sensor data or event data of the forklifts or AMR.

18. The non-transitory storage medium of claim 11, wherein:

the new near-edge node is a warehouse, the new near-edge node receives the second dataset from one or more edge-nodes that operate in the warehouse, and the one or more edge-nodes comprise one of a forklift or an Autonomous Mobile Robot.

19. The non-transitory storage medium of claim 11, wherein determining a convergence value for each of the plurality of ML models when the ML models are trained using a first dataset comprises the following operations:

evaluating the training loss curve for each of the plurality of ML models; and determining the epoch value based on the training loss curve.

20. The non-transitory storage medium of claim 11, wherein the selected ML model that is deployed at the new near edge node is used to control an operation of one or more edge-nodes associated with the new near-edge node.

* * * * *